United States Patent
Oh et al.

(10) Patent No.: US 9,784,358 B2
(45) Date of Patent: Oct. 10, 2017

(54) DEVICE FOR NOISE VIBRATION REDUCTION OF ALTERNATOR'S PULLEY

(71) Applicant: HYUNDAI MOTOR COMPANY, Seoul (KR)

(72) Inventors: Wan-Soo Oh, Yongin-si (KR); Heung-Seok Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 88 days.

(21) Appl. No.: 14/840,793

(22) Filed: Aug. 31, 2015

(65) Prior Publication Data
US 2016/0223067 A1 Aug. 4, 2016

(30) Foreign Application Priority Data
Jan. 30, 2015 (KR) .................. 10-2015-0014859

(51) Int. Cl.
*F16F 15/14* (2006.01)
*F16H 55/36* (2006.01)

(52) U.S. Cl.
CPC ....... *F16H 55/36* (2013.01); *F16H 2055/366* (2013.01)

(58) Field of Classification Search
CPC ....... F16F 5/145; F16F 15/14; Y10T 74/2128; Y10T 74/2184; Y10T 74/213
USPC .......... 474/166; 74/574.2, 574.3, 574.4, 604
See application file for complete search history.

(56) References Cited

U.S. PATENT DOCUMENTS

| | | | | |
|---|---|---|---|---|
| 1,085,443 A | * | 1/1914 | Lanchester | B64G 1/283 464/27 |
| 1,627,917 A | * | 5/1927 | Masury | F16F 15/14 267/124 |
| 1,718,208 A | * | 6/1929 | Anibal | F16F 15/1215 74/574.2 |
| 2,112,984 A | * | 4/1938 | Chilton | F16F 15/14 74/604 |
| 2,154,063 A | * | 4/1939 | Chilton | F16F 15/26 74/604 |
| 2,272,189 A | * | 2/1942 | De Pew | F16F 15/145 74/570.1 |
| 2,332,072 A | * | 10/1943 | Gregory | F16F 15/145 74/604 |
| 2,346,972 A | * | 4/1944 | Kishline | F16F 15/14 74/574.2 |
| 2,367,709 A | * | 1/1945 | Arkus-Duntov | F16F 15/31 188/379 |

(Continued)

FOREIGN PATENT DOCUMENTS

| | | |
|---|---|---|
| JP | 3-69339 | 7/1991 |
| JP | 9-110345 | 4/1997 |

(Continued)

*Primary Examiner* — Henry Liu
(74) *Attorney, Agent, or Firm* — Brinks Gilson & Lione

(57) ABSTRACT

A device for noise vibration reduction of an alternator's pulley includes a pulley part combined with a rotating shaft of the alternator and also has a pendulum damper adapter part inserted into the pulley. In particular, the pendulum damper adapter part includes a pendulum pamper part and rotate or reciprocate the pendulum damper part to generate a vibration having the same frequency as but an opposite phase to a vibration of the pulley part so as to reduce the vibration of the pulley part.

11 Claims, 12 Drawing Sheets

(56) References Cited

U.S. PATENT DOCUMENTS

| | | | | |
|---|---|---|---|---|
| 2,448,973 | A * | 9/1948 | Gregory | F16F 15/14 74/604 |
| 2,666,341 | A * | 1/1954 | Riopelle | F16F 15/14 74/574.3 |
| 3,559,502 | A * | 2/1971 | Lofthouse | F16F 15/14 74/574.3 |
| 4,739,679 | A * | 4/1988 | Berger | F16F 15/145 74/574.3 |
| 5,239,886 | A * | 8/1993 | Kohring | F16F 15/10 29/434 |
| 5,295,411 | A * | 3/1994 | Speckhart | F16F 15/14 74/574.3 |
| 5,520,271 | A * | 5/1996 | Kohno | F16F 15/14 192/30 V |
| 5,619,887 | A * | 4/1997 | Simpson | F01L 1/16 123/90.31 |
| 5,884,735 | A * | 3/1999 | Eckel | F16F 15/145 188/378 |
| 5,976,020 | A * | 11/1999 | Lohaus | F16F 15/1205 192/30 V |
| 6,026,776 | A * | 2/2000 | Winberg | F16C 3/20 123/192.1 |
| 6,089,121 | A * | 7/2000 | Lohaus | F16F 15/1407 464/68.4 |
| 6,220,970 | B1 * | 4/2001 | Berger | F02B 67/00 464/180 |
| 6,345,552 | B1 * | 2/2002 | Rohrig | F16F 15/1435 74/574.4 |
| 6,358,153 | B1 * | 3/2002 | Carlson | F16F 15/14 188/378 |
| 6,374,698 | B1 * | 4/2002 | Carlson | F16F 15/145 192/207 |
| 6,427,656 | B1 * | 8/2002 | Drecq | F16F 15/145 123/192.1 |
| 6,705,181 | B2 * | 3/2004 | Tabuchi | F16F 15/145 192/209 |
| 6,742,412 | B2 * | 6/2004 | Feldhaus | F16F 15/145 188/378 |
| 6,918,835 | B2 * | 7/2005 | Aoki | F16D 9/00 464/32 |
| 7,004,294 | B2 * | 2/2006 | Williams | F16F 15/145 188/378 |
| 7,048,661 | B2 * | 5/2006 | Shibata | F16D 3/68 464/73 |
| 8,146,457 | B2 * | 4/2012 | Wright | F16F 15/145 74/572.2 |
| 8,161,739 | B2 | 4/2012 | Degler et al. | |
| 8,800,731 | B2 * | 8/2014 | Engelmann | F16F 15/145 188/290 |
| 8,813,604 | B2 * | 8/2014 | Geist | F16F 15/145 123/192.2 |
| 8,985,502 | B2 * | 3/2015 | Krysinski | B64C 27/001 244/17.11 |
| 9,291,252 | B2 * | 3/2016 | Oh | F16H 55/36 |
| 2002/0189393 | A1 * | 12/2002 | Tabuchi | F16F 15/145 74/574.2 |
| 2003/0000783 | A1 * | 1/2003 | Kanai | F04B 27/0895 188/378 |
| 2003/0002991 | A1 * | 1/2003 | Kawata | F04B 27/1036 417/222.1 |
| 2003/0012661 | A1 * | 1/2003 | Kawata | F04B 27/0895 417/223 |
| 2003/0037636 | A1 * | 2/2003 | Kawata | F04B 27/0895 74/574.2 |
| 2004/0149075 | A1 * | 8/2004 | Williams | F16F 15/145 74/570.2 |
| 2008/0314709 | A1 * | 12/2008 | Ishikawa | F16D 9/08 192/55.1 |
| 2009/0188463 | A1 * | 7/2009 | Wright | F16F 15/145 123/192.1 |
| 2010/0122605 | A1 * | 5/2010 | Maienschein | F16F 15/1457 74/574.2 |
| 2010/0175956 | A1 * | 7/2010 | Zadoks | F16F 15/173 188/268 |
| 2015/0204416 | A1 * | 7/2015 | Schnaedelbach | F16F 15/145 74/574.2 |
| 2015/0323041 | A1 * | 11/2015 | Takikawa | F16F 15/145 192/3.29 |

FOREIGN PATENT DOCUMENTS

| | | |
|---|---|---|
| JP | 2000-283242 A | 10/2000 |
| JP | 2003-014089 A | 1/2003 |
| JP | 2014-516142 A | 7/2014 |
| WO | 2014/080776 A1 | 5/2014 |

* cited by examiner

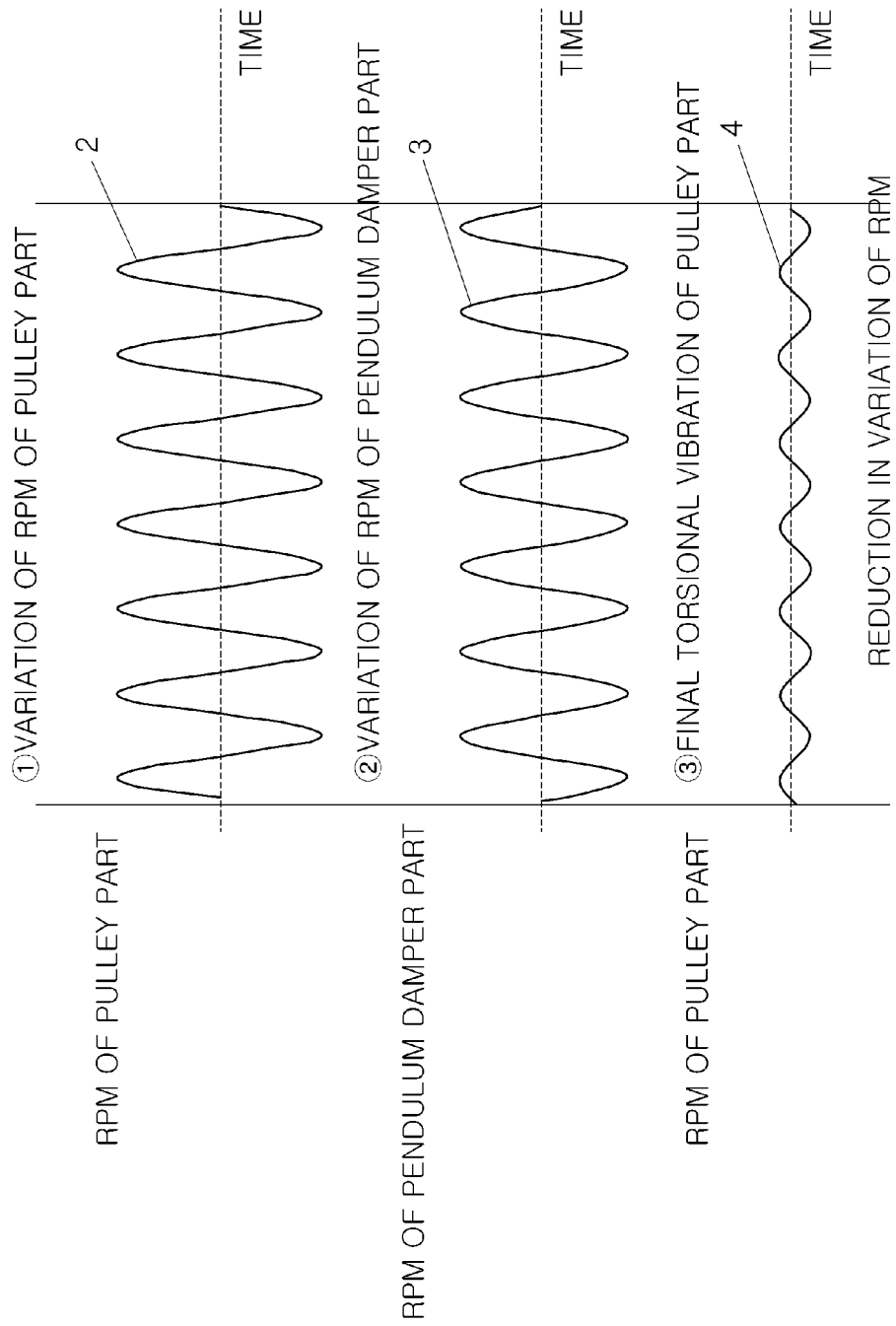

DEVICE FOR NOISE VIBRATION REDUCTION OF ALTERNATOR'S PULLEY

CROSS-REFERENCE TO RELATED APPLICATIONS

This application claims the benefit of Korean Patent Application No. 10-2015-0014859, filed on Jan. 30, 2015, which is hereby incorporated by reference in its entirety.

FIELD

The present disclosure relates to a device for noise vibration reduction of an alternator's pulley.

BACKGROUND

The statements in this section merely provide background information related to the present disclosure and may not constitute prior art.

An alternator is a device which is equipped in an engine of a vehicle to generate power, in which a rotating shaft of the alternator is combined with a pulley which is connected to a crank shaft by a belt.

A method for allowing an alternator to generate power is as follows. First, a driving force of the engine is delivered to the crank shaft. The crank shaft converts the driving force of the engine to a rotating force and the rotating force of the crank shaft is delivered to the alternator's pulley through the belt. The alternator's pulley delivers the rotating force to the rotating shaft of the alternator to operate a power generator connected to the rotating shaft, and as a result, the alternator generates power.

However, when the alternator is used over a long period of time, the combined state of the alternator's pulley with the belt may loose and the alternator's pulley may run idle. That is, as the driving distance of the vehicle is long, the rotating force is frequently applied to the alternator's pulley through the belt, thereby reducing tension and durability of the belt. As a result, the combined state of the alternator's pulley with the belt looses and the alternator's pulley runs idle. When the alternator's pulley runs idle, noise and vibration are greatly generated at the combined portion of the alternator's pulley with the belt.

According to the related art to reduce the noise and the vibration, there is a need to increase the tension of the belt between the crank shaft and the alternator's pulley so as to reinforce the combined state of the alternator's pulley with the belt.

However, according to the related art, to increase the tension of the belt, there is a need to apply a larger rotating force to the crank shaft so as to drive the belt having a high tension. As a result, fuel efficiency of the vehicle may be remarkably aggravated or reduced.

SUMMARY

The present disclosure provides a device for noise vibration reduction of an alternator's pulley capable of damping noise and/or vibration of the alternator's pulley.

In accordance with an embodiment of the present disclosure, a device for noise vibration reduction of an alternator's pulley includes: a pulley part configured to be combined with a rotating shaft of the alternator and have a pendulum damper adapter part inserted thereinto; and the pendulum damper adapter part comprising a pendulum damper part and configured to rotate or reciprocate the pendulum damper part to generate a vibration having the substantially same frequency as but an opposite phase to a vibration of the pulley part so as to reduce the vibration of the pulley part.

The pendulum damper adapter part may include: an adapter part configured to be inserted into and combined with the pulley part; the pendulum damper part configured to rotate or reciprocate and generate a vibration having the substantially same frequency as but an opposite phase to the vibration of the pulley part; and a body part configured to be combined with the pendulum damper part and deliver the vibration of the pendulum generated by the pendulum damper part to the pulley part through the adapter part to reduce the vibration of the pulley part.

In the pendulum damper adapter part, the pendulum damper part may control a distance (r) from a rotating shaft of the pendulum damper part to a center of gravity of the pendulum damper part to generate a vibration having the same frequency as but the opposite phase to the vibration of the pulley part.

The distance (r) from the rotating shaft of the pendulum damper part to the center of gravity of the pendulum damper part may be calculated by the following Equation.

$$r = R \times \left(\frac{\Omega}{2\pi f_0}\right)^2$$

The pendulum damper adapter part may be inserted into the pulley part and then combined with the pulley part by a bolt to reduce a shock vibration due to backlash which is generated by an anti-phase torsional vibration of the pendulum damper adapter.

The pendulum damper adapter part may be inserted into the pulley part and then combined with the rotating shaft of the alternator by a nut.

The body part may be combined with a plurality of pendulum damper parts.

The pendulum damper part may be combined with the body part at two places and the pendulum damper part may be provided with a guide hole to allow the pendulum damper part to rotate or reciprocate based on a roller part of the body part at a portion where the pendulum damper part is combined with the body part.

The pendulum damper adapter part and the pulley part may be combined with each other on a circumference at the same distance from the rotating shaft of the pulley part by a plurality of bolts.

Further areas of applicability will become apparent from the description provided herein. It should be understood that the description and specific examples are intended for purposes of illustration only and are not intended to limit the scope of the present disclosure.

DRAWINGS

Further areas of applicability will become apparent from the description provided herein. It should be understood that the description and specific examples are intended for purposes of illustration only and are not intended to limit the scope of the present disclosure.

Figure 1:
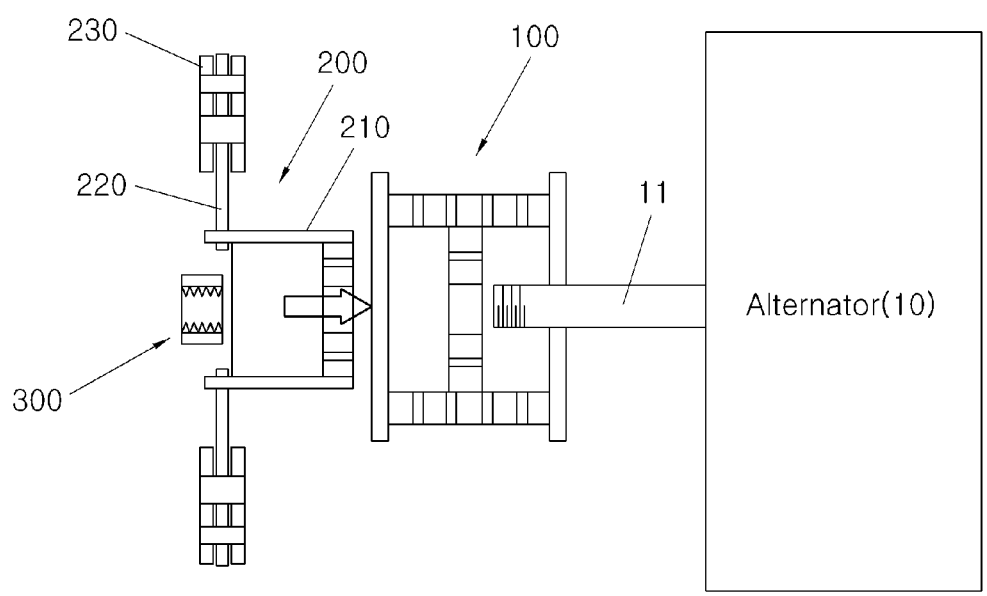
FIG. 1 is a side view illustrating a combination process of an alternator shaft, a pulley part, and a pendulum damper adapter part in a device for noise vibration reduction of an alternator's pulley according to an exemplary embodiment of the present disclosure.
Figure 2:
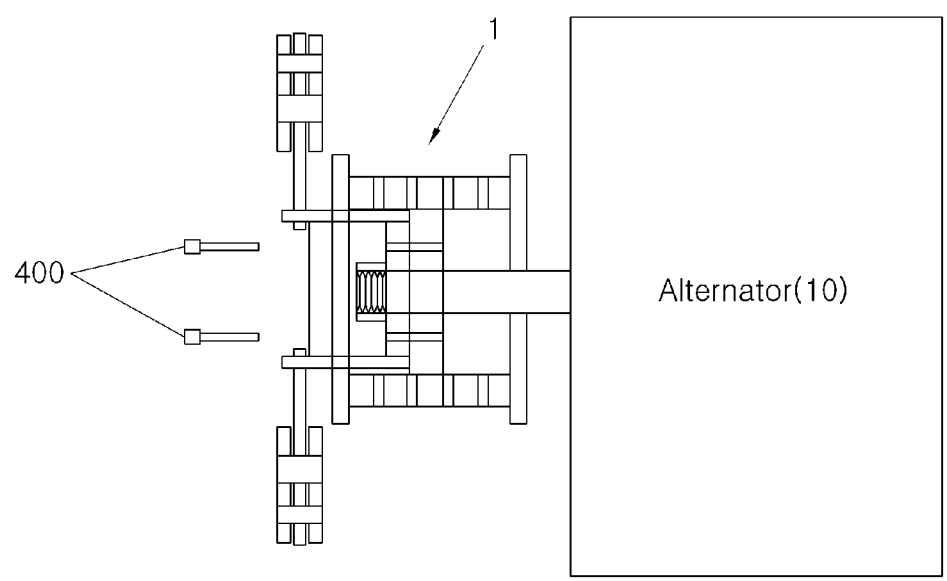
FIG. 2 is a side view illustrating a nut combination and a bolt combination in the device for noise vibration reduction of an alternator's pulley according to the exemplary embodiment of the present disclosure.
Figure 3:
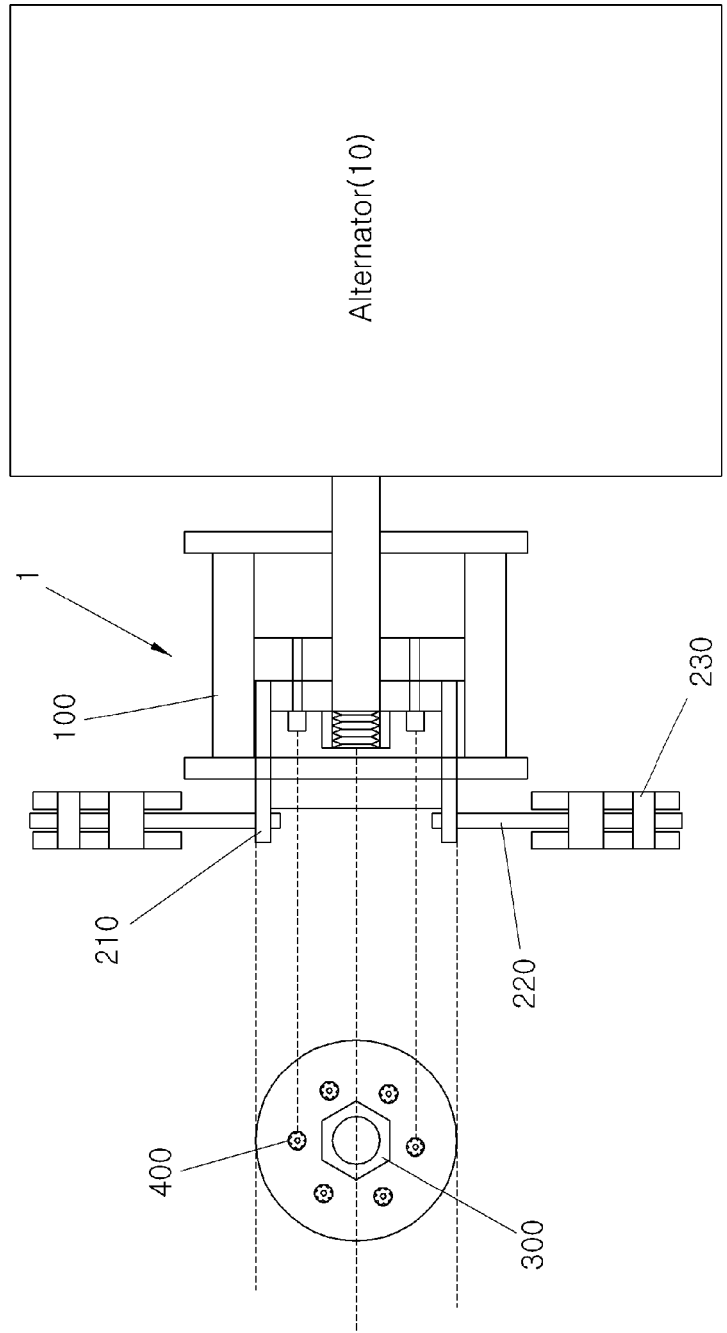
FIG. 3 is a side view illustrating the device for noise vibration reduction of an alternator's pulley according to the exemplary embodiment of the present disclosure.
Figure 4:
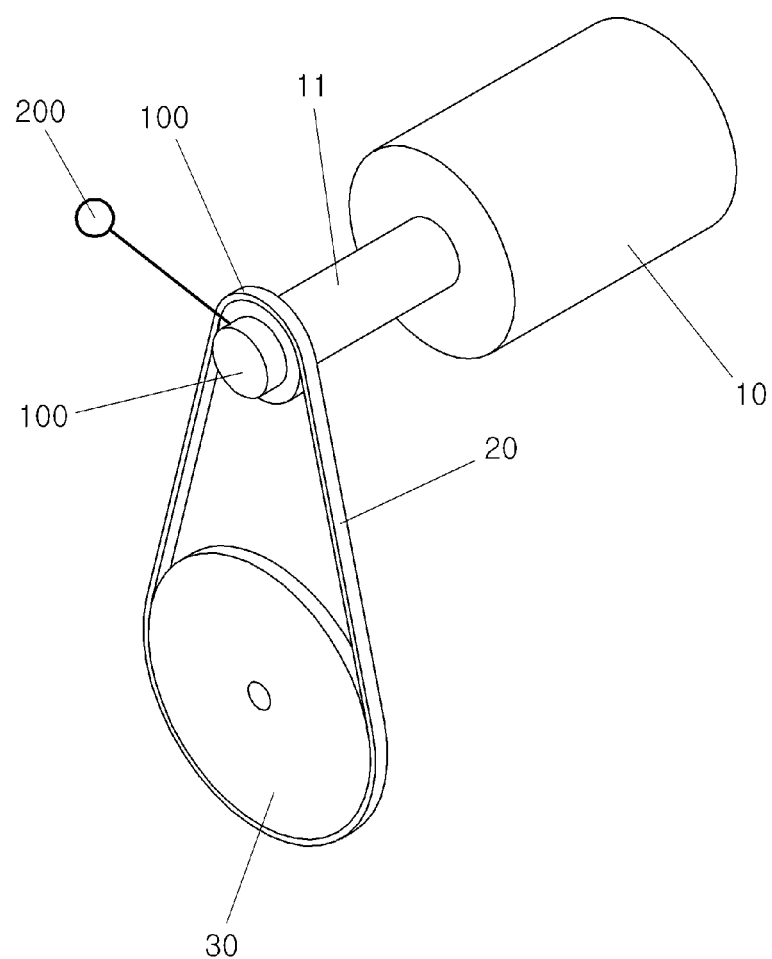
FIG. 4 is a conceptual diagram illustrating a concept of the device for noise vibration reduction of an alternators pulley according to the exemplary embodiment of the present disclosure.
Figure 5:
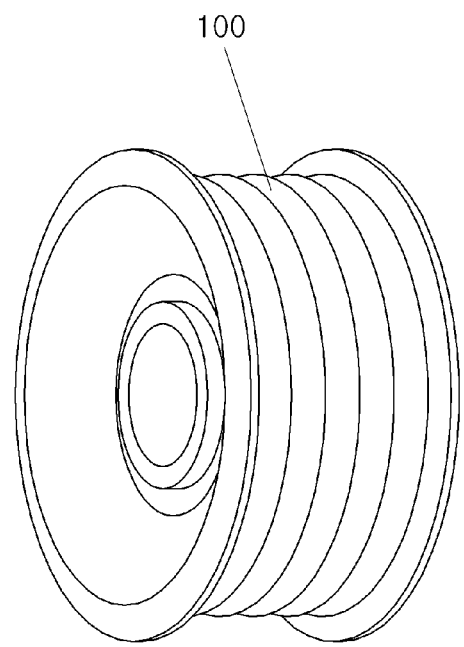
FIG. 5 is a perspective view illustrating a pulley part in the device for noise vibration reduction of an alternators pulley according to the exemplary embodiment of the present disclosure.
Figure 6:
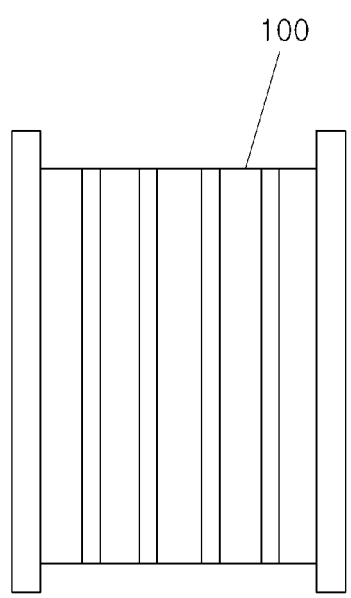
FIG. 6 is a side view illustrating the pulley part in the device for noise vibration reduction of an alternators pulley according to the exemplary embodiment of the present disclosure.
Figure 7:
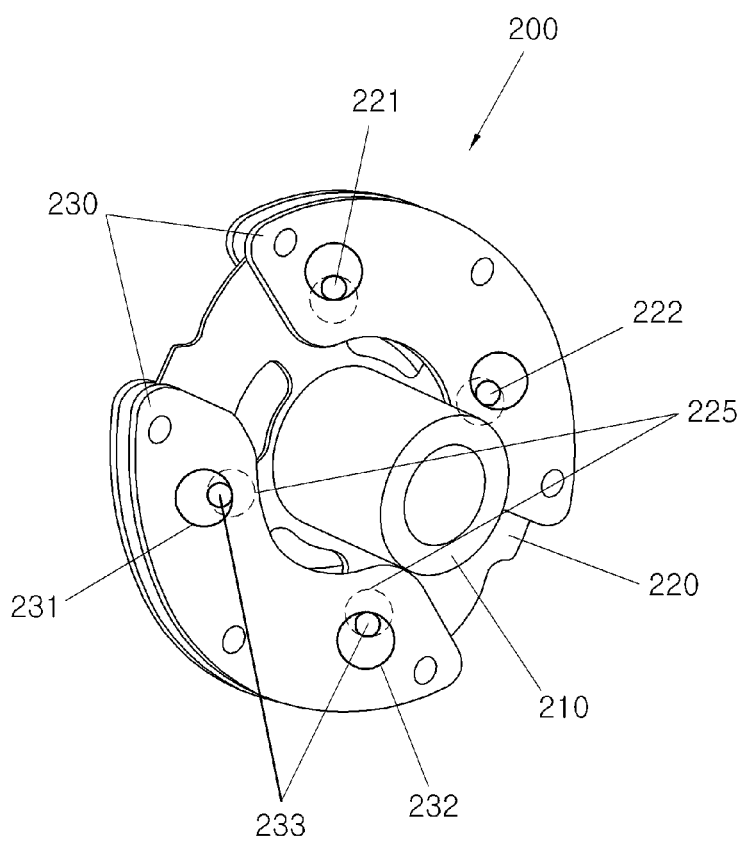
FIG. 7 is a perspective view illustrating a pendulum damper adapter part in a device for noise vibration reduction of an alternator's pulley according to a first exemplary embodiment of the present disclosure.
Figure 8:
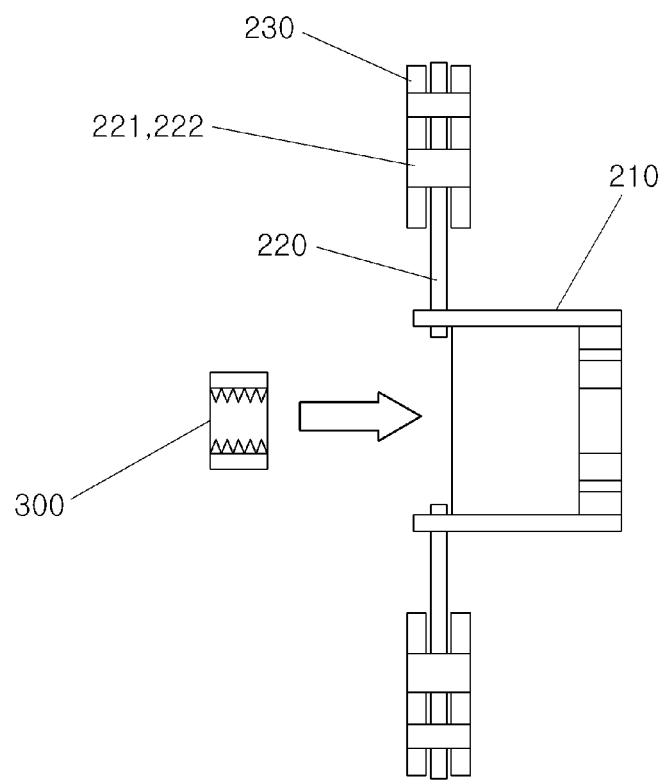
FIG. 8 is a side view illustrating the pendulum damper adapter part in the device for noise vibration reduction of an alternators pulley according to the exemplary embodiment of the present disclosure.
Figure 9:
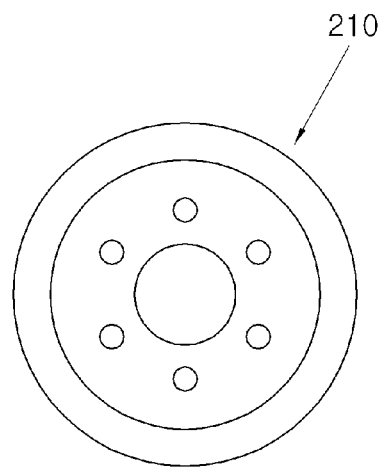
FIG. 9 is a front view illustrating an adapter part in the device for noise vibration reduction of an alternators pulley according to the exemplary embodiment of the present disclosure.
Figure 10:
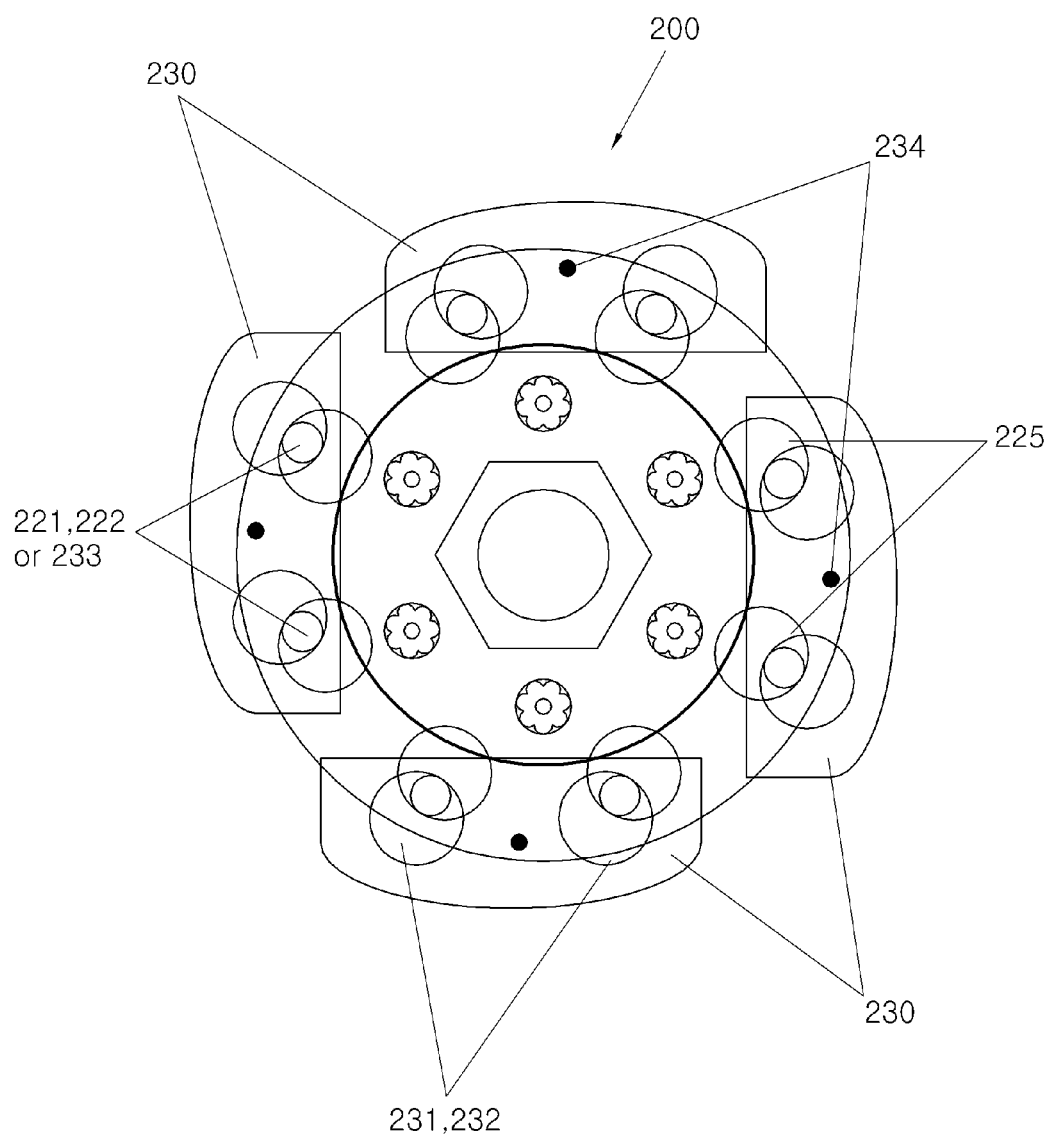
FIG. 10 is a front view illustrating a pendulum damper adapter part in a device for noise vibration reduction of an alternators pulley according to a second exemplary embodiment of the present disclosure.
Figure 11:
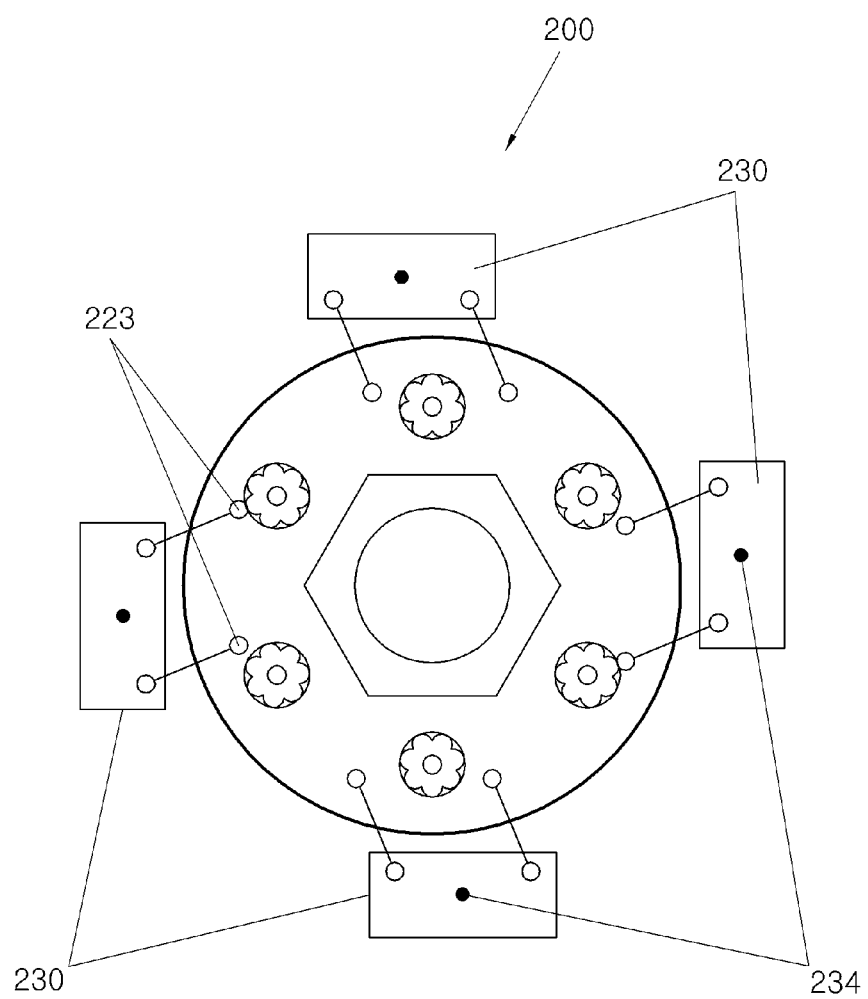
FIG. 11 is a front view illustrating a pendulum damper adapter part in a device for noise vibration reduction of an alternator's pulley according to a third exemplary embodiment of the present disclosure.
Figure 12:
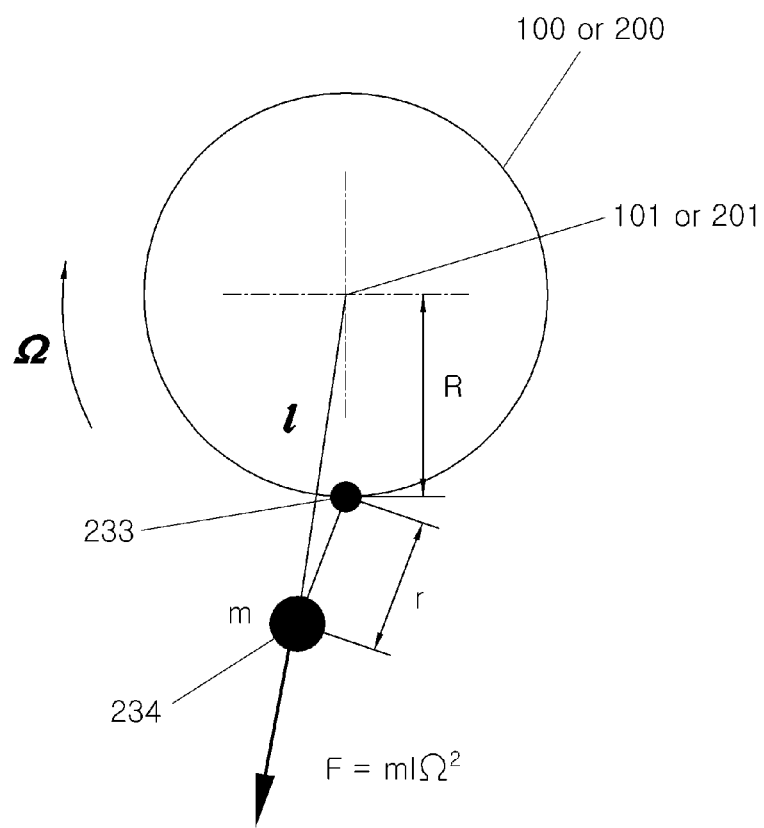

FIG. 12 is a conceptual diagram illustrating an operation concept of the pendulum damper adapter part in the device for noise vibration reduction of an alternator's pulley according to the exemplary embodiment of the present disclosure; and FIG. 13 is a diagram illustrating an effect of the device for noise vibration reduction of an alternators pulley according to the exemplary embodiment of the present disclosure.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, unless indicated otherwise in the specification, it is to be understood that all the technical terms used in the specification are construed as meaning as those that are generally understood by those who skilled in the art and as excessively comprehensive meanings and excessively reduced meanings. Further, the accompanying drawings are provided to easily understand the technical spirit of the present disclosure disclosed in the present specification, and therefore the technical spirit is not limited to the accompany drawings. Therefore, it is to be construed that the accompanying drawings include all modifications and replacements included in the technical spirit and the technical scope disclosed n the present specification.

Referring to FIGS. 1 to 13, a device for noise vibration reduction of an alternator's pulley according to an exemplary embodiment of the present disclosure may include a pulley part 100 and a pendulum damper adapter part 200.

The pulley part 100 is combined with a rotating shaft 11 of an alternator 10 and has a pendulum damper adapter part 200 inserted thereinto. In more detail, the pulley part 100 may be combined with the rotating shaft 11 of the alternator 10 and may be connected to a crank shaft 30 by a belt 20. Further, the pulley part 100 may have the pendulum damper adapter part 200 inserted thereinto to reduce a vibration 2 of the pulley part in response to a vibration 3 which is generated by the pendulum damper adapter part 200. Here, the pulley part 100 may generate the vibration and noise depending on the combined state with the crank shaft 30 or the belt part.

The pendulum damper adapter part 200 rotates or reciprocates a pendulum damper part 230 (also referred to herein simply as "pendulum") mounted thereon to generate the vibration 3 which has the same frequency as, but an opposite phase to the vibration 2 of the pulley part 100, thereby reducing the vibration of the pulley part 100. In more detail, the pendulum damper adapter part 200 rotates or reciprocates a the pendulum damper part 230 mounted thereon to enable the pendulum damper part 230 to generate the vibration 3 which has the same frequency as, but the opposite phase to the vibration 2 of the pulley part 100, thereby reducing the vibration and the noise of the pulley part 100.

Further, the pendulum damper adapter part 200 may be inserted into the pulley part 100 and then combined with the rotating shaft 11 of the alternator by a nut. Further, the pendulum damper adapter part 200 may be inserted into the pulley part 100 and may be then combined with the pulley part 100 by a bolt to reduce a shock vibration due to backlash which is generated by an anti-phase torsional vibration of the pendulum damper adapter 200.

Here, the pendulum damper adapter part 200 and the pulley part 100 may be combined with each other on a circumference at the same distance from the rotating shaft 201 by a plurality of bolts, and more particularly, may be combined with each other at six places by a bolt. Further, herein, in the vibration 2 of the pulley part, a torsional vibration of the pulley part may be represented by RPM and in the vibration 3 of the pendulum damper adapter part, a vibration of the pendulum damper adapter part may be represented by an RPM.

In other words, to inhibit or prevent a clearance from occurring between an outer surface of the pendulum damper adapter part 200 and an inner surface of the pulley part 100, the plurality of bolts are fastened on the circumference at the same distance from the rotating shaft of the pulley part 100.

In more detail, the pendulum damper adapter part 200 may include an adapter part 210, a body part 220, and a pendulum damper part 230.

The adapter 210 is inserted into and combined with the pulley part 100. In more detail, the adapter part 210 may be inserted into the pulley part 100 and then combined with the rotating shaft 11 of the alternator by the nut.

Further, the adapter part 210 may be inserted into the pulley part 100 and then combined with the pulley part 100 by the bolt(s) to reduce the shock vibration due to the backlash which is generated by the anti-phase torsional vibration of the body part 220.

In particular, the adapter part 210 and the pulley part 100 may be combined with each other on the circumference at the same distance from the rotating shaft of the same adapter part as the rotating shaft 201 of the pendulum damper adapter part by the plurality of bolts, and more particularly, may be combined with each other at six places by the bolt. In this case, the six places may be formed on the circumference at the same distance from the rotating shaft of the adapter part 210, having the same interval.

The body part 220 is combined with the pendulum damper part 230 and delivers the vibration 3 of the pendulum, which is generated by the pendulum damper part 230, to the pulley part 100 through the adapter part 210, thereby reducing the vibration of the pulley part 100.

In more detail, the body part 220 is combined with the pendulum damper part 230 and delivers the vibration 3 of the pendulum, which is generated by the pendulum damper part 230, to the pulley part 100 through the adapter part 210 to damp the RPM of the pulley part which is the torsional vibration 2 of the pulley part, thereby reducing the vibration of the pulley part 100.

Here, in the vibration 2 of the pulley part, the torsional vibration of the pulley part may be represented by the RPM. In this case, the pendulum damper part 230 which is combined with the body part 220 may be in plural, and more particularly, two or four pendulum damper parts 230 may be combined with the body part 220.

In this configuration, the body part 220 may be further provided with roller parts 221 and 222 which are a shaft having a protrusion shape to enable the pendulum damper part 230 mounted thereon to rotate or reciprocate, and more particularly, the body part 220 may include two roller parts 221 and 222. In this case, the roller parts 221 and 222 may be a rotating shaft 233 of the pendulum damper part 230.

The pendulum damper part 230 rotates and reciprocates while being combined with the body part 220 and generates the vibration 3 which has the same frequency as, but the opposite phase to the vibration 2 of the pulley part.

In this case, the pendulum damper part 230 which is combined with the body part 220 may be in plural, and in particular, two or four pendulum damper parts 230 may be combined with the body part 220. Here, in the vibration 3 of the pulley part, the torsional vibration of the pendulum damper part may be represented by the RPM.

In more detail, the pendulum damper part 230 may be mounted on the body part 220, while being formed in two layers to have a portion of the body part 220 inserted thereinto. Further, the pendulum damper part 230 may be provided with guide holes 231 and 232 into which the roller parts 221, 222 and 233 are inserted so as to rotate or reciprocate based on the roller parts 221, 222 and 233 of the body part 220, and more particularly, the pendulum damper part 230 may be provided with the two guide holes 231 and 232 into which the roller parts 221 and 222 may be each inserted. In this case, the guide holes 231 and 232 may be provided with a space into which the roller parts 221 and 222 are inserted to enable pendulum damper part 230 to rotate or reciprocate.

Further, the body part 220 may be provided with guide holes 225 similarly. Therefore, the roller parts 221, 222 and 233 may rivet shapes which pass through guide holes 231 and 232 provided with the pendulum damper part 230 and guide holes 225 provided with the body part 220 so that the pendulum damper part 230 and the body part 220 are assembled.

Further, referring to FIG. 13, the pendulum damper part 230 may rotate or reciprocate to generate the vibration 3 which has the same frequency as, but the opposite phase to the vibration 2 of the pulley part. In more detail, the pendulum damper part 230 rotates or reciprocates based on the roller parts 221 and 222 of the body part 220 to generate the vibration 3 of the pendulum which has the same RPM and frequency as, but the opposite phase to the pulley part which are the torsional vibration 2 of the pulley part 100.

In this case, the phase of the vibration 3 of the pendulum of the pendulum damper part 230 may be smaller than that of the vibration 2 of the pulley part. That is, the pendulum damper part 230 may rotate based on the roller parts 221 and 222 of the body part 220 to reduce the RPM of the pulley part which is the torsional vibration 2 of the pulley part and may generate the vibration 3 of the pendulum, which has the same frequency as, but the opposite phase to the vibration 2 of the pulley part, from the rotating motion or the reciprocating motion of the pendulum damper part 230.

The so generated vibration 3 of the pendulum is delivered to the pulley part 100 through the body part 220 and the adapter part 210 to offset the RPM of the pulley part which is the torsional vibration 2 of the pulley part, thereby reducing a final torsional vibration 4 of the pulley part.

Here, the pendulum damper part 230 may control a distance (r) from the rotating shaft 233 of the pendulum damper part 230 to a center of gravity 234 of the pendulum to generate the vibration which has the same frequency as, but the opposite phase to the vibration of the pulley part 100.

In this case, the distance (r) from the rotating shaft 233 of the pendulum damper part to the center of gravity 234 of the pendulum may be calculated by the following Equation.

$$f_0 = \frac{\Omega}{2\pi}\sqrt{\frac{R}{r}} \qquad \text{[Equation 1]}$$

The above [Equation 1] is as follows by being arranged based on a function of the distance r from the rotating shaft 233 of the pendulum damper part 230 to the center of gravity 234 of the pendulum.

$$r = R \times \left(\frac{\Omega}{2\pi f_0}\right)^2 \qquad \text{[Equation 2]}$$

Here, the R represents the distance from a center 101 of the pulley part to the rotating shaft 233 of the pendulum damper part, the $\Omega$ represents a rotating speed of the pulley part 100, and the $f_0$ represents the frequency of the vibration of the pulley part.

According to the device for noise vibration reduction of an alternator's pulley in accordance with the exemplary embodiments of the present disclosure, it is possible to damp the noise and the vibration of the alternator's pulley.

As described above, the exemplary embodiment of the present disclosure may be changed by those skilled in the art within the scope of the basic technical idea of the present disclosure and the scope of the present disclosure should be analyzed based on the appended claims.

What is claimed is:

1. A device for noise vibration reduction of an alternator's pulley, comprising:
   a pulley part configured to be combined with a rotating shaft of the alternator; and
   a pendulum damper adapter part inserted into the pulley part and combined with the rotating shaft of the alternator, the pendulum damper adapter part comprising a pendulum damper part and an adapter part surrounded by and connected to the pendulum damper part,
   wherein the pendulum damper adapter part is configured to rotate or reciprocate the pendulum damper part to generate a vibration having a substantially same frequency as but an opposite phase to a vibration of the pulley part, the adapter part configured to transfer the generated vibration to the pulley part so as to reduce the vibration of the pulley part.

2. The device according to claim 1, wherein the pendulum damper adapter part further comprises:
   a body part configured to connect the pendulum damper part to the adapter part
   wherein the adapter part is inserted into the pulley part and combined with the rotating shaft of the alternator, and
   wherein the pendulum damper part is configured to rotate or reciprocate and generate the substantially same frequency as but an opposite phase to the vibration of the pulley part, and the body part is configured to deliver the vibration generated by the pendulum damper part to the pulley part through the adapter part to reduce the vibration of the pulley part.

3. The device according to claim 2, wherein the body part is combined with a plurality of pendulum damper parts.

4. The device according to claim 2, wherein the pendulum damper part is combined with the body part in at least two places.

5. The device according to claim 2, wherein the pendulum damper part is provided with a guide hole to allow the pendulum damper part to rotate or reciprocate based on a roller part of the body part at a portion where the pendulum damper part is combined with the body part.

6. The device according to claim 2, wherein the pendulum damper part is formed in at least two layers, and the body is inserted therebetween.

7. The device according to claim 2, wherein the pendulum damper part controls a distance (r) from a rotating shaft of the pendulum damper part to a center of gravity of the pendulum damper part to generate the vibration having the substantially same frequency as but the opposite phase to the vibration of the pulley part.

8. The device according to claim 7, wherein the distance (r) from the rotating shaft of the pendulum damper part to the center of gravity of the pendulum damper part is calculated by the following Equation $$r = R \times \left(\frac{\Omega}{2\pi f_0}\right)^2$$

(in the above Equation, R represents a distance from a center of the pulley part to the rotating shaft of the pendulum damper part, $\Omega$ represents a rotating speed of the pulley part, and $f_0$ represents the frequency of the vibration of the pulley part).

9. The device according to claim 1, wherein the pendulum damper adapter part is inserted into the pulley part and then combined with the pulley part by a bolt to reduce a shock vibration due to backlash which is generated by an antiphase torsional vibration of the pendulum damper adapter part.

10. The device according to claim 1, wherein the pendulum damper adapter part and the pulley part are combined with each other on a circumference at a same distance from a rotating shaft of the pulley part by a plurality of bolts to inhibit or prevent a clearance from occurring between an outer surface of the pendulum damper adapter part and an inner surface of the pulley part.

11. A device for noise vibration reduction of an alternator's pulley combined with a rotating shaft, comprising:
   a pulley part; and
   a pendulum damper adapter part comprising:
      a pendulum damper part configured to rotate or reciprocate to generate a vibration having a substantially same frequency as but an opposite phase to a vibration of the pulley part so as to reduce a vibration of the pulley part, and
      an adapter part inserted into the pulley part and combined with a rotating shaft of the alternator, the adapter part surrounded by and connected to the pendulum damper part so as to transfer the generated vibration to the pulley part.

* * * * *